United States Patent

Kimura et al.

[11] Patent Number: 5,939,487
[45] Date of Patent: Aug. 17, 1999

[54] ROOM TEMPERATURE CURABLE ORGANOPOLYSILOXANE COMPOSITION

[75] Inventors: Tsuneo Kimura, Annaka; Kazuyuki Suzuki, Matsuida-machi; Mamoru Teshigawara, Tomioka, all of Japan

[73] Assignee: Shin-Etsu Chemical Co., Ltd., Tokyo, Japan

[21] Appl. No.: 08/885,953

[22] Filed: Jun. 30, 1997

[30] Foreign Application Priority Data

Jul. 1, 1996 [JP] Japan ................................ 8-190107

[51] Int. Cl.$^6$ ...................................... C08K 3/10
[52] U.S. Cl. .................... 524/786; 524/789; 524/444; 524/451; 524/449; 524/430; 524/425; 524/498; 528/10; 528/43
[58] Field of Search ...................... 524/786, 789, 524/444, 451, 449, 430, 425, 448, 437; 528/10, 43

[56] References Cited

U.S. PATENT DOCUMENTS

| | | | |
|---|---|---|---|
| 3,303,163 | 2/1967 | Goosens | 528/21 |
| 4,131,588 | 12/1978 | Smith, Jr. | 524/789 |
| 4,131,589 | 12/1978 | Smith, Jr. | 524/789 |
| 4,514,529 | 4/1985 | Beers et al. | 523/200 |
| 5,013,781 | 5/1991 | Koshii et al. | 524/864 |
| 5,086,107 | 2/1992 | Arai et al. | |
| 5,340,847 | 8/1994 | Hanazuka et al. | |
| 5,534,588 | 7/1996 | Knepper et al. | 524/730 |

FOREIGN PATENT DOCUMENTS

| | | |
|---|---|---|
| 0 539 234 | 4/1993 | European Pat. Off. |
| 0 604 997 | 7/1994 | European Pat. Off. |

OTHER PUBLICATIONS

Handbook of Fillers and Reinforcements for Plastics, Ed. Katz, H. S., Milewski, J. V., Van Nostrand Rheinhold Company, 1978.

*Primary Examiner*—Melvyn I. Marquis
*Assistant Examiner*—Mark W. Milstead
*Attorney, Agent, or Firm*—Oblon, Spivak, McClelland, Maier & Neustadt, P.C.

[57] ABSTRACT

A room temperature curable organopolysiloxane composition including:

(A) a diorganopolysiloxane terminated with a hydroxyl group at the both terminal ends and having a viscosity at 25° C. of 25 to 1,000,000 cSt, (B) an organosilane having 3 or more hydrolyzable groups per molecule, a partially hydrolyzed and condensed product thereof or a mixture thereof, said hydrolyzable group is a ketoxime group or an alkenyloxy groups, and a thin leaf-like inorganic filler. This can give cured products with good oil resistance, and suitable as FIPG materials for automobiles.

15 Claims, 1 Drawing Sheet

ROOM TEMPERATURE CURABLE ORGANOPOLYSILOXANE COMPOSITION

BACKGROUND OF THE INVENTION

1. Field of the Invention

The present invention relates to a novel room temperature curable organopolysiloxane composition, and particularly to such a composition useful as an FIPG (Formed In Place Gaskets) material for automobiles.

2. Description of the Prior Art

For sealing engine oil used at engine parts, gear oil, automatic transmission oil, etc., oil resistant gaskets or packing made of cork, organic rubbers, asbestos, etc. are used. These materials are disadvantageously troublesome in inventory control and working process, and have a drawback of poor reliability in seal performance.

For this reason, FIPG technique using room temperature curable compositions having good adhesion and heat-resistance, has been used, and workability is being improved. However, the room temperature curable silicone rubber compositions and the cured products thereof are affected by acidic additives such as metallic phosphates, metallic phosphites or the like added to the oils for automobiles, so that rubber properties of the cured products are deteriorated or the adhesion is lowered. Therefore, for the purpose of neutralization of the acidic additives, oxides or carbonates of metals such as calcium, zinc, magnesium or the like are added to the compositions. To prevent rubber properties from lowering in case the polymer chains of the cured products are cleaved by the acidic additive, it has been performed to increase the crosslink density of the cured products.

However, to enhance the performance of the oils, recently, the amount of the phosphorus acidic additives added to the oils have been increased, and a sulfur compound or a molybdenum compound which can not be neutralized with said carbonates is added to oils. Therefore, it is now difficult to achieve a satisfactory level of oil resistance only by the addition of the metallic oxide or the metallic carbonate or the increased crosslink density.

SUMMARY OF THE INVENTION

Accordingly, an object of the present invention is to provide a room temperature curable organopolysiloxane composition capable of giving cured products with good oil resistance, particularly to a composition suited as FIPG materials for automobiles.

Thus, according to the present invention, a room temperature curable organopolysiloxane composition comprising (A) a diorganopolysiloxane terminated with a hydroxyl group at the both terminal ends of its molecular chain and having a viscosity at 25° C. of 25 to 1,000,000 cSt, (B) an organosilane having 3 or more hydrolyzable groups per molecule, a partially hydrolyzed and condensed product thereof having 3 or more hydrolyzable groups per molecule or a mixture thereof, said hydrolyzable group being selected from the group consisting of ketoxime groups and alkenyloxy groups, and (C) a thin leaf-like inorganic filler having an average particle diameter of 50 μm or less, is provided.

The composition of the present invention has good oil resistance, and useful as an FIPG material for automobiles.

DETAILED DESCRIPTION OF PREFERRED EMBODIMENTS

Figure 1:
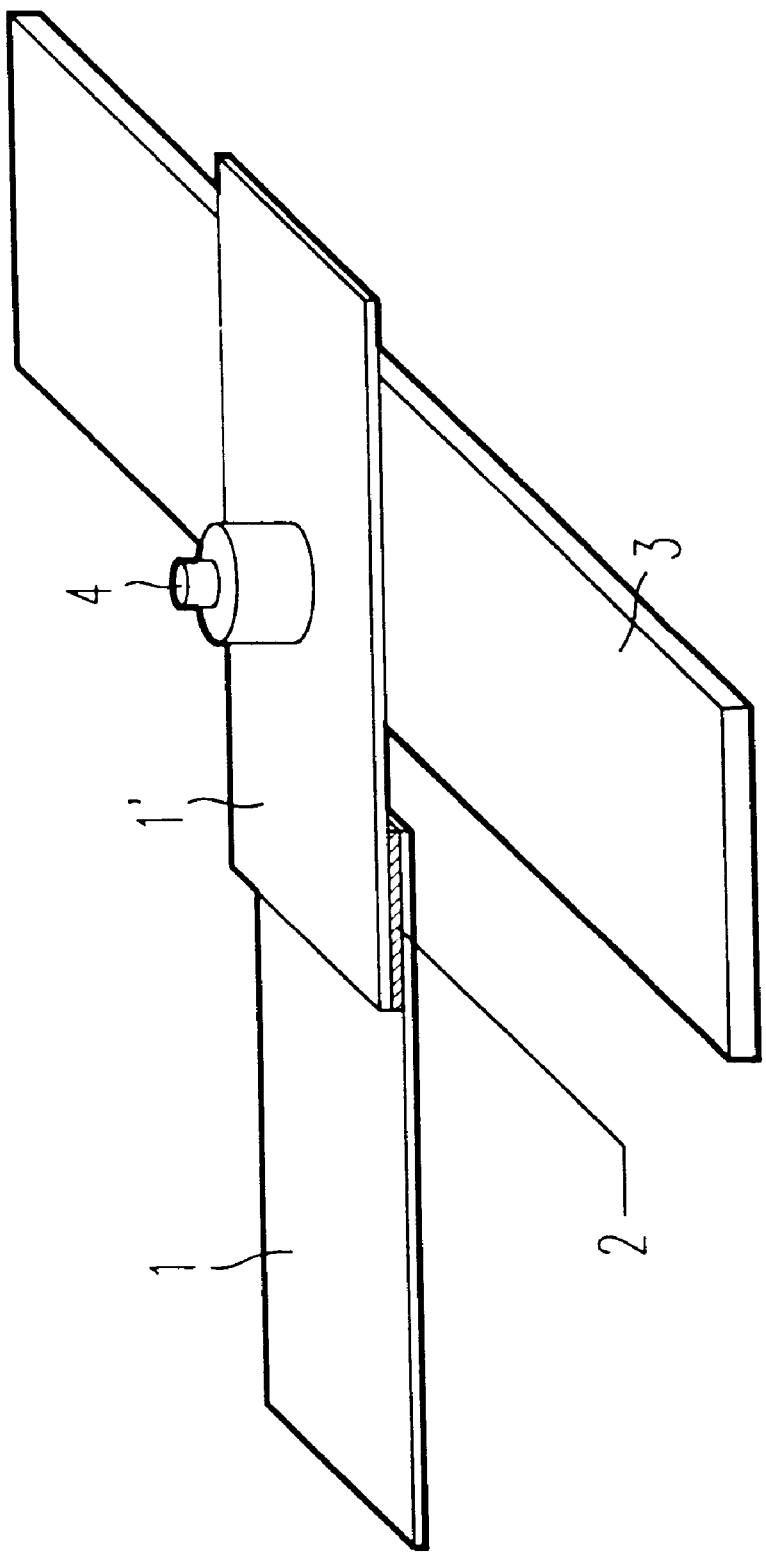
FIG. 1 illustrates a specimen for testing adhesion of a cured product to a substrate. In the figure 1 and 1' indicates an Al or Fe substrate with a thickness of 1 mm, 2 indicates a test sample measuring 2.5 cm×1.0 cm, 3 indicates a spacer with a thickness of 2 mm, and 4 indicates a weight with a weight of 500 g.

The invention will now be described in detailed below.

Component (A)

The component (A) is a diorganopolysiloxane which is terminated with a hydroxyl group at the both terminal ends thereof, and has a viscosity at 25° C. of 25 to 1,000,000 cSt, preferably 1,000 to 100,000 cSt.

The diorganopolysiloxane includes, for example, compounds having the general formula (1):

$$HO-[R_2SiO]_L-H \quad (1)$$

wherein R is a substituted or unsubstituted monovalent hydrocarbon group, and L is a number such that the compound has a viscosity in the range as mentioned above, normally an integer of 10 or more.

R in the general formula (1) is a substituted or unsubstituted monovalent hydrocarbon group normally having 1 to 10 carbon atoms, preferably 1 to 8 carbon atoms, including, for example, alkyl groups such as methyl, ethyl, propyl and butyl; cycloalkyl groups such as cyclohexyl; alkenyl groups such as vinyl and allyl; aryl groups such as phenyl and tolyl; aralky groups such as benzyl and phenylethyl; and corresponding substituted groups in which a part or whole of the hydrogen groups attached to the carbon atoms thereof have been substituted with a halogen atom, cyano group or the like, e.g., the chloromethyl group, trifluoropropyl group and cyanoethyl group. Among these, preferred are methyl, vinyl, phenyl and trifluoropropyl groups. Particularly preferred are methyl and phenyl groups.

Component (B)

The component (B) of the present invention is an organosilane having three or more hydrolyzable groups selected from the group consisting of ketoxime groups and alkenyloxy groups, per molecule, and/or the partially hydrolyzed and condensed products thereof. The component (B) acts as a crosslinking agent in the composition of the present invention.

The organosilane of the component (B) includes, for example, iminoxysilanes having the general formula (2):

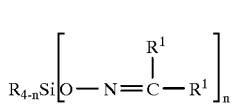

(2)

wherein R is as defined above, $R^1$ represents independently a hydrogen atom or a substituted or unsubstituted monovalent hydrocarbon group, and n is an integer of 3 or 4; iminoxysilanes having the general formula (3):

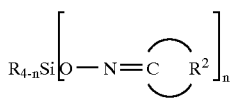

wherein R and n are as defined above, R² represents independently a substituted or unsubstituted divalent hydrocarbon group, alkenyloxy silanes having the formula (4):

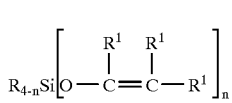

wherein R, R¹ and n are as defined above, and alkenyloxy silanes having the formula (5):

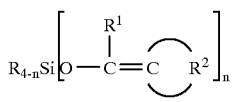

wherein R, R¹, R² and n are as defined above.

The substituted or unsubstituted monovalent hydrocarbon group out of R¹ includes those exemplified for R, and is preferably alkyl groups, particularly preferably methyl, ethyl and propyl groups.

R² includes, for example, alkylene groups with 4 to 8 carbon atoms, preferably 5 to 8 carbon atoms, such as pentamethylene, hexamethylene, tetramethylene, and 3-methylpentamethylene. Specifically, preferred are pentamethylene, hexamethylene and tetramethylene groups, and particularly preferred are pentamethylene and hexamethylene groups.

The iminoxysilane represented by the general formula (2) includes, for example, methyltri(butanoxime)silane, vinyltri(butanoxime)silane, phenyltri(butanoxime)silane, propyltri(butanoxime)silane, tetra(butanoxime)silane, 3,3,3-trifluoropropyltri(butanoxime)silane, 3-chloropropyltri(butanoxime)silane, methyltri(propanoxime)silane, methyltri(pentanoxime)silane, and methyltri(isopentanoxime)silane.

The iminoxysilane represented by the general formula (3) includes, for example, vinyl tri(cyclopentanoxime)silane and methyltri(cyclohexanoxime)silane.

The alkenyloxysilane represented by the general formula (4) includes, for example, methyltri(isopropenoxy)silane, vinyltri(isopropenoxy)silane, phenyltri(isopropenoxy)silane, propyltri(isopropenoxy)silane, tetra(isopropenoxy)silane, 3,3,3-trifluoropropyltri(isopropenoxy)silane, 3-chloropropyltri(isopropenoxy)silane and methyltri(2-butenyloxy)silane.

The alkenyloxysilane represented by the general formula (5) includes, for example, vinyltri(cyclopentenoxy)silane, and methyltri(cyclohexenyloxy)silane.

Out of the compounds above, preferred are methyltri(butanoxime)silane, vinyltri(butanoxime)silane, phenyltri(butanoxime)silane, tetra(butanoxime)silane, methyltri(isopropenoxy)silane, vinyltri(isopropenoxy)silane, and phenyltri(isopropenoxy)silane. Particularly preferred are methyltri(butanoxime)silane, vinyltri(butanoxime)silane, and vinyltri(isopropenoxy)silane.

Besides the organosilane described above, the component (B) may be organosiloxanes obtained by partial hydrolysis and condensation of the organosilane, provided that the organosiloxanes must contain at least 3 groups selected from the group consisting of ketoxime groups and alkenyloxy groups.

The crosslinking agent of the component (B) may be used singly or in combination of two or more kinds thereof.

The amount of the component (B) may be normally 3 to 30 parts by weight, preferably 5 to 20 parts by weight, per 100 parts by weight of the component (A). If the amount of this component is too small, gelation of the composition may occur or cured products obtained from the composition may become poor in hardness and physical properties such as adhesion. If the amount is too large, shrinkage of the composition on curing may be too great, and elasticity may be lowered.

Component (C)

The component (C) is a thin leaf-like inorganic powder having an average particle diameter of 50 μm or less, preferably 30 μm or less, particularly preferably 1 to 30 μm. The particle diameter of a thin leaf-like particle herein means the length of the particle. The thin leaf-like inorganic powder is added to the composition of the present invention to improve oil resistance, for example, to maintain rubber properties or adhesion of the cured products while they are immersed in oil. If the average particle diameter of the thin leaf-like inorganic powder exceeds 50 μm, the viscosity of the composition increases greatly, resulting in lowering of workability, and elongation, tensile strength or adhesion of the rubber obtained on curing are lowered, resulting in lowering of oil-sealing performance.

Any thin leaf-like inorganic powder having a form of thin leaf due to its crystalline structure, can be used as the component (C), including for example talc, mica, kaolin, and alumina which has been prepared as having a thin leaf-like form. Of these, preferred are talc, mica and the alumina, and more preferred are talk and alumina. The thin leaf-like inorganic powders can be used singly or in combination of two or more of kinds.

The amount of the component (C) may be normally 1 to 100 parts by weight, preferably 3 to 50 parts by weight, particularly preferably 5 to 25 parts by weight. If the amount of this component is too small, the function to adsorb sulfur compounds etc. is lowered, resulting in that oil resistance is lowered and good rubber properties or adhesion can not be maintained. If the amount of the component (C) is too large, on the other hand, the viscosity of the composition of the present invention has too high a viscosity, resulting in lowering of curability and lowering of workability.

Other Components

To the composition of the present invention, in addition to the components (A) to (C) above, a variety of aids can be added, as long as the object of the present invention is attained.

Such optional aids include, for example, reinforcing agents such as fumed silica, precipitated silica, quartz powder, carbon powder, etc.; fibrous fillers such as asbestos, glass fiber, carbon fiber, organic fiber, etc.; basic fillers such as calcium carbonate, zinc carbonate, zinc oxide, magnesium oxide, Celite® (diatomaceous earth), and the like; heat-resistance improvers such as red oxide, cerium oxide, etc.; cold resistance improvers; dehydrating agents; rust preventives; adhesion improvers such as γ-aminopropyltrimethoxysilane; liquid reinforcing agents such as network polysiloxane composed of triorganosiloxy units and SiO₂ units; and curing agents including alkyltin ester compounds such as dibutyltin diacetate, dibutyltin dilaurate and dibutyltin dioctoate, and strong basic compounds such as diazabicyclononane and tetramethylguanidinopropyltrimethoxysilane. The amounts of these optional components are not limited, as long as the object of the present invention is attained with no damage.

In particular, use of the basic filler above, preferably zinc oxide, calcium carbonate or zinc carbonate enables further improvement in oil-resistance, and a smaller amount of the basic filler than that as conventionally required to achieve the same level of effects. Specifically, the amount of the basic filler may be normally 1 to 100 parts by weight, preferably 3 to 50 parts by weight, particularly preferably 3 to 30 parts by weight per 100 parts by weight of the component (A).

The composition of the invention can also optionally contain an aminoalkoxysilane having the formula: $H_2NC_3H_6Si(OR)_3$ where R is independently methyl or ethyl group. The aminoalkoxysilane includes, for example, aminopropyltriethoxysilane, and aminopropyltrimethoxysilane. The amount of this silane is preferably 0.1 to 20 parts by weight, more preferably 0.2 to 10 parts by weight, per 100 parts by weight of the component (A).

The composition of the present invention can be obtained as a one-pack type room temperature curable composition, usually by mixing the components (A) to (C) and other optional components uniformly in a dry atmosphere. Alternatively, it is possible to knead components (A) and (C) first, followed by adding a component (B) to the mixture of the components (A) and (C) under reduced pressure, or also it is possible to mix components (A) and (B) under reduced pressure first, followed by kneading a component (C) with the mixture of the components (A) and (B).

The composition obtained is cured by moisture upon exposure to the air to produce a rubberlike elastic material.

In the composition and the cured products thereof, the thin leaf-like inorganic powder having a large specific surface area adsorb sulfur compounds, etc. Therefore, if the cured products come into contact with engine oil, gear oil or automatic transmission oil to which a sulfur compound or the like has been added, the oil resistance is not deteriorated and rubber properties and adhesion are maintained. For this, the composition of the present invention is useful as an FIPG material in assembly of engines and oil-sealing material for places which comes into contact with engine oil.

EXAMPLES

The present invention will now be described specifically with reference to working examples and comparative examples. In examples, "part(s)" indicates "part(s) by weight" and viscosity was measured at 25° C.

Comparative Example 1

The materials below were mixed under water-free conditions to prepare a room temperature curable organopolysiloxane composition (Sample 1).

| | |
|---|---|
| Dimethylpolysiloxane terminated with a hydroxyl group at the both terminal ends and having a viscosity of 20,000 cSt | 100.0 parts |
| Zinc carbonate | 10 parts |
| Fumed silica | 10.0 parts |
| Vinyltri(butanoxime)silane | 10.0 parts |

-continued

| | |
|---|---|
| Dibutyltin dioctoate | 0.1 part |
| γ-aminopropyltriethoxysilane | 1.0 part. |

(I) Evaluation of Initial Physical Properties

Sample 1 above was formed into a sheet with a thickness of 2 mm and left to stand in an atmosphere of 20° C. and 55% RH for curing. The resulting cured product was examined for rubber properties according to JIS K 6301. The results are given in Table 1.

The adhesion of the cured product to a Al substrate or a Fe substrate was examined as follows. As shown in FIG. 1, a substrate plate 1' of Al or Fe was laid in part over a length of 10 mm on another substrate plate 1 of the same material, the substrate plates each measuring 100 mm×25 mm×1 mm. Sample 1 was inserted into the doubled part so as to form a layer with a thickness of 1 mm. The other end of the substrate plate 1' was laid on a spacer 3 with the same thickness as the substrate plate 1, and a weight 4 was placed on the substrate plate 1'. The specimen thus prepared was left to stand in an atmosphere of 20° C. and 55% RH for 7 days, so that a cured product of Sample 1 was formed between the substrate plates. Subsequently, in tensile test, the both ends of the specimen was pulled to the opposite direction to measure an adhesive strength under shear. The results are given in Table 1.

(II) Evaluation of Oil Resistance

Oil resistance of Sample 1 was evaluated as follows. A cured product and a specimen for evaluation of adhesion were prepared in the same manner as in (I), and then were immersed in an engine oil (Tradename: TOYOTA CASTLE MORTOR OIL NEOGEAR SH5W-30) at 120° C. for 240 hours. Thereafter, rubber properties and adhesion were examined in the same manner as in (I). The results are given in Table 1.

Comparative Example 2

Procedure of Comparative Example 1 was repeated, except that 10 parts of calcium carbonate was used in place of 10 parts of Zinc carbonate, to prepare Sample 2. This sample was evaluated in the same manner as in Comparative Example 1. The results are given in Table 1.

Example 1

The materials below were mixed under water-free conditions to prepare a room temperature curable organopolysiloxane composition (Sample 3).

| | |
|---|---|
| Dimethylpolysiloxane terminated with a hydroxyl group at the both terminal ends and having a viscosity of 20,000 cSt | 100.0 parts |
| Talc powder with an average particle diameter of 12 μm | 10 parts |
| Fumed silica | 10.0 parts |
| Vinyltri(butanoxime)silane | 10.0 parts |
| Dibutyltin dioctoate | 0.1 part |
| γ-aminopropyltriethoxysilane | 1.0 part. |

The Sample 3 was evaluated in the same manner as in Comparative Example 1. The results are given in Table 1.

Example 2

The procedure of Example 1 was repeated, except that 10 parts of talc powder with an average particle diameter of 12

μm was replaced with 10 parts of mica powder with an average particle diameter of 25 μm, to prepare Sample 4, which was then evaluated in the same manner as in Comparative Example 1. The results are given in Table 1.

Example 3

The procedure of Example 1 was repeated, except that 10 parts of talc powder with an average particle diameter of 12 μm was replaced with 10 parts of kaolin powder with an average particle diameter of 10 μm, to prepare Sample 5, which was then evaluated in the same manner as in Comparative Example 1. The results are given in Table 1.

Example 4

The procedure of Example 1 was repeated, except that 10 parts of talc powder with an average particle diameter of 12 μm was replaced with 10 parts of a thin leaf-like alumina with an average particle diameter of 4 μm, to prepare Sample 6, which was then evaluated in the same manner as in Comparative Example 1. The results are given in Table 1.

TABLE 1

|  |  | Comparative Example | | Example | | | |
|---|---|---|---|---|---|---|---|
|  |  | 1 | 2 | 1 | 2 | 3 | 4 |
| No. of sample | | 1 | 2 | 3 | 4 | 5 | 6 |
| Initial properties | Hardness *1 | 38 | 40 | 40 | 45 | 40 | 39 |
| | Elongation (%) | 290 | 360 | 350 | 300 | 320 | 300 |
| | Tensile strength (kgf/cm$^2$) | 31 | 29 | 30 | 30 | 32 | 28 |
| | Al-adhesive strength under shear (kgf/cm$^2$) | 19 | 18 | 20 | 18 | 17 | 19 |
| | Fe-adhesive strength under shear (kgf/cm$^2$) | 20 | 19 | 20 | 19 | 20 | 18 |
| Oil Resistance | Hardness | 29 | 20 | 30 | 33 | 28 | 27 |
| | Elongation (%) | 180 | 150 | 350 | 320 | 350 | 320 |
| | Tensile strength (kgf/cm$^2$) | 25 | 10 | 30 | 28 | 29 | 25 |
| | Al-adhesive strength under shear (kgf/cm$^2$) | 10 | 5 | 12 | 13 | 14 | 12 |
| | Fe-adhesive strength under shear (kgf/cm$^2$) | *2 | *2 | 10 | 11 | 12 | 11 |

Remarks:
*1 Hardness: measured using the spring tester type A.
*2 impossible to measure.

Comparative Example 3

The materials below were mixed under water-free conditions to prepare Sample 7.

| Dimethylpolysiloxane terminated with a hydroxyl group at the both terminal ends and having a viscosity of 5,000 cst | 100 parts |
|---|---|
| Calcium carbonate | 50 parts |
| Fumed silica | 3.0 parts |
| Vinyltri(isopropenoxy)silane | 8.0 parts |
| Tetramethylguanidinopropyltrimethoxysilane | 1.0 part |
| γ-aminopropyltriethoxysilane | 1.0 part |

The Sample 7 was evaluated in the same manner as in Comparative Example 1. The results are given in Table 2.

Example 5

The materials below were mixed under water-free conditions to prepare Sample 8.

| Dimethylpolysiloxane terminated with a hydroxyl group at the both terminal ends and having a viscosity of 5,000 cSt | 100 parts |
|---|---|
| Calcium carbonate | 25 parts |
| Talc powder with an average particle diameter of 3 μm | 25 parts |
| Fumed silica | 3.0 parts |
| Vinyltri(isopropenoxy)silane | 8.0 parts |
| Tetramethylguanidinopropyltrimethoxysilane | 1.0 part |
| γ-aminopropyltriethoxysilane | 1.0 part |

The Sample 8 was evaluated in the same manner as in Comparative Example 1. The results are given in Table 2.

Comparative Example 4

The materials below were mixed under water-free conditions to prepare Sample 9.

| Dimethylpolysiloxane terminated with a hydroxyl group at the both terminal ends and having a viscosity of 5,000 cSt | 100 parts |
|---|---|
| Calcium carbonate | 25 parts |
| Talc powder with an average particle diameter of 100 μm | 25 parts |
| Fumed silica | 3.0 parts |
| Vinyltri(isopropenoxy)silane | 8. 0 parts |
| Tetramethylguanidinopropyltrimethoxysilane | 1.0 part |
| γ-aminopropyltriethoxysilane | 1.0 part |

The Sample 9 was evaluated in the same manner as in Comparative Example 1. The results are given in Table 2.

TABLE 2

|  |  | Comparative Example 3 | Example 5 | Comparative Example 4 |
|---|---|---|---|---|
| No. of sample | | 7 | 8 | 9 |
| Initial properties | Hardness *1 | 50 | 48 | 45 |
| | Elongation (%) | 180 | 200 | 100 |
| | Tensile strength (kgf/cm$^2$) | 35 | 34 | 25 |
| | Al-adhesive strength under shear (kgf/cm$^2$) | 20 | 22 | 12 |
| | Fe-adhesive strength under shear (kgf/cm$^2$) | 19 | 20 | 10 |
| Oil Resistance | Hardness | 35 | 45 | 20 |
| | Elongation (%) | 150 | 190 | 80 |
| | Tensile strength (kgf/cm$^2$) | 18 | 32 | 8 |

TABLE 2-continued

|  | Comparative Example 3 | Example 5 | Comparative Example 4 |
|---|---|---|---|
| Al-adhesive strength under shear (kgf/cm$^2$) | 10 | 20 | 1 |
| Fe-adhesive strength under shear (kgf/cm$^2$) | *2 | 19 | 1 |

Remarks:
*1 Hardness: measured using the spring tester type A.
*2 Impossible to measure.

What is claimed is:

1. A room temperature curable organopolysiloxane composition comprising (A) a diorganopolysiloxane terminated with a hydroxyl group at the both terminal ends of its molecular chain and having a viscosity at 25° C. of 25 to 1,000,000 cSt, (B) an organosilane having 3 or more hydrolyzable groups per molecule, a partially hydrolyzed and condensed product thereof having 3 or more hydrolyzable groups per molecule or a mixture thereof, said hydrolyzable group being selected from the group consisting of ketoxime groups and alkenyloxy groups, and (C) a thin leaf inorganic filler having an average particle diameter of 30 μm or less.

2. The composition of claim 1, wherein the diorganopolysiloxane of the component (A) is represented by the formula (1):

$$\text{HO}-[\text{R}_2\text{SiO}]_L-\text{H} \quad (1)$$

wherein R is a substituted or unsubstituted monovalent hydrocarbon, and L is a number such that the compound has a viscosity in the range of 25 to 1,000,000 cSt at 25° C.

3. The composition of claim 2, wherein in the formula (1) R is a methyl group or a phenyl group.

4. The composition of claim 2, wherein the organosilane of the component (B) is selected from the group consisting of iminoxysilanes having the general formula (2):

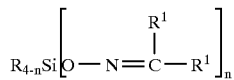

(2)

wherein R is as defined in claim 2, R$^1$ represents independently a hydrogen atom or a substituted or unsubstituted monovalent hydrocarbon group, and n is an integer of 3 or 4; iminoxysilanes having the general formula (3):

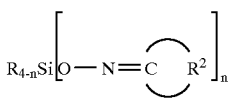

(3)

wherein R and n are as defined above, R$^2$ represents independently a substituted or unsubstituted divalent hydrocarbon group, alkenyloxy silanes having the formula (4):

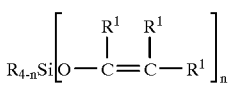

(4)

wherein R, R$^1$ and n are as defined above, and alkenyloxy silanes having the formula (5):

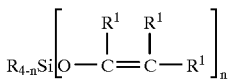

(4)

wherein R, R$^1$, R$^2$ and n are as defined above.

5. The composition of claim 1, wherein the component (B) is selected from the group consisting of methyltri(butanoxime)silane, vinyltri(butanoxime)silane, phenyltri(butanoxime)silane, tetra(butanoxime)silane, methyltri(isopropenoxy)silane, vinyltri(isopropenoxy)silane, and phenyltri(isopropenoxy)silane.

6. The composition of claim 1, wherein the inorganic powder of the component (C) has an average particle diameter of 30 μm or less.

7. The composition of claim 1, wherein said thin leaf-like inorganic powder of the component (C) is at least one member selected from the group consisting of talc, mica, kaolin and alumina.

8. The component of claim 1, wherein the amount of the component (B) and the amount of the component (C) are 3 to 30 parts by weight and 1 to 100 parts by weight, respectively, per 100 parts by weight of the component (A).

9. The composition of claim 1, which further comprises a basic filler.

10. The composition of claim 9, wherein the basic filler is selected from the group consisting of calcium carbonate, zinc carbonate, zinc oxide, magnesium oxide and diatomaceous earth.

11. The composition of claim 9, wherein the amount of the basic filler is 1 to 100 parts by weight per 100 parts by weight of the component (A).

12. The composition of claim 1, which further comprises an aminoalkoxysilane having the formula: H$_2$NC$_3$H$_6$Si(OR)$_3$ where R independently stands for a methyl group or ethyl group.

13. The composition of claim 12, wherein the amount of said aminoalkoxysilane is 0.1 to 20 parts by weight per 100 parts by weight of the component (A).

14. The composition of claim 1, wherein the hydrolyzable groups of component (B) are ketoxime groups.

15. The composition of claim 1, wherein the hydrolyzable groups of component (B) are alkenyloxy groups.

* * * * *